(12) United States Patent
Youssef et al.

(10) Patent No.: US 9,894,080 B1
(45) Date of Patent: Feb. 13, 2018

(54) SEQUENCE HOPPING ALGORITHM FOR SECURING GOOSE MESSAGES

(71) Applicants: Tarek Youssef, Miami, FL (US);
Mohamad El Hariri, Miami, FL (US);
Osama Mohammed, Miami, FL (US)

(72) Inventors: Tarek Youssef, Miami, FL (US);
Mohamad El Hariri, Miami, FL (US);
Osama Mohammed, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 15/285,126

(22) Filed: Oct. 4, 2016

(51) Int. Cl.
*H04L 29/06* (2006.01)
*H04L 29/08* (2006.01)
*H04L 9/08* (2006.01)

(52) U.S. Cl.
CPC .......... *H04L 63/123* (2013.01); *H04L 9/0869* (2013.01); *H04L 63/1425* (2013.01); *H04L 63/1441* (2013.01); *H04L 63/18* (2013.01); *H04L 67/1095* (2013.01)

(58) Field of Classification Search
CPC . H04L 63/123; H04L 9/0869; H04L 63/1425; H04L 63/1441; H04L 63/18; H04L 67/1095
USPC .............................................. 370/335; 726/1
See application file for complete search history.

(56) References Cited

U.S. PATENT DOCUMENTS

| | | | | |
|---|---|---|---|---|
| 5,696,760 | A * | 12/1997 | Hardin | H04W 74/0875 370/230 |
| 6,694,146 | B1 * | 2/2004 | Hardin | H04B 1/1615 455/343.1 |
| 6,782,264 | B2 * | 8/2004 | Anderson | G01S 5/02 455/456.1 |
| 7,574,599 | B1 * | 8/2009 | Zhang | H04L 63/061 713/168 |
| 8,155,326 | B2 * | 4/2012 | Schweitzer, III | G01N 29/14 381/56 |
| 2002/0038426 | A1 * | 3/2002 | Pettersson | G06F 21/32 713/186 |
| 2003/0026223 | A1 * | 2/2003 | Eriksson | H04B 1/7143 370/335 |
| 2004/0006705 | A1 * | 1/2004 | Walker | H04B 7/2662 726/3 |

(Continued)

*Primary Examiner* — Abu Sholeman
(74) *Attorney, Agent, or Firm* — Saliwanchik, Lloyd & Eisenschenk

(57) ABSTRACT

Embodiments of the present invention include methods and apparatuses for securing data transfer in power-system automation and smart grids. Embodiments of the present invention can be particularly helpful in securing GOOSE messages. A method of securing data transfer according to an embodiment of the present invention can include a message sequence synchronization and monitoring server (MSSMS) providing random seeds to a publisher intelligent electronic device (IED) and a subscriber IED, both having a pseudo random number generators (PRNGs), inputting the random seeds into the PRNG of the publisher IED and generating a publisher sequence hopping number, sending a message to the subscriber IED with the publisher sequence hopping number attached, and determining if the message is valid by comparing the message attached publisher sequence hopping number to a subscriber sequence hopping number generated by the subscriber PRNG.

18 Claims, 5 Drawing Sheets

(56) References Cited

U.S. PATENT DOCUMENTS

| | | | |
|---|---|---|---|
| 2005/0040984 A1* | 2/2005 | Weals | G01S 7/282 342/201 |
| 2007/0207800 A1* | 9/2007 | Daley | H04L 41/0803 455/425 |
| 2007/0249341 A1* | 10/2007 | Chu | H04W 16/02 455/434 |
| 2007/0297458 A1* | 12/2007 | Narayanan | G06F 17/30578 370/503 |
| 2008/0162588 A1* | 7/2008 | Rusch | G06F 17/30575 |
| 2008/0254801 A1* | 10/2008 | Struhsaker | H04W 84/14 455/440 |
| 2009/0247134 A1* | 10/2009 | Jeide | H04L 67/1095 455/414.2 |
| 2009/0282125 A1* | 11/2009 | Jeide | H04L 67/1095 709/217 |
| 2010/0179996 A1* | 7/2010 | Jones | G06Q 10/107 709/206 |
| 2011/0208822 A1* | 8/2011 | Rathod | G06Q 30/02 709/206 |
| 2011/0238969 A1* | 9/2011 | Warkentin | G06F 9/441 713/2 |
| 2011/0320575 A1* | 12/2011 | Pope | H04N 21/8543 709/220 |
| 2012/0084438 A1* | 4/2012 | Raleigh | H04L 41/046 709/224 |
| 2012/0131223 A1* | 5/2012 | Watson | H04L 69/16 709/235 |
| 2012/0227104 A1* | 9/2012 | Sinha | H04L 63/0227 726/22 |
| 2012/0320918 A1* | 12/2012 | Fomin | H04L 49/70 370/392 |
| 2013/0031291 A1* | 1/2013 | Edwards | G06F 21/554 711/6 |
| 2013/0256385 A1* | 10/2013 | Sugito | B23K 3/08 228/10 |
| 2014/0013325 A1* | 1/2014 | Shimoni | G06F 9/45558 718/1 |
| 2014/0074929 A1* | 3/2014 | Kountouris | G08B 25/007 709/204 |
| 2014/0282021 A1* | 9/2014 | Dolezilek | H04L 41/22 715/735 |
| 2015/0079941 A1* | 3/2015 | Arkko | H04L 63/123 455/411 |
| 2015/0327045 A1* | 11/2015 | Chang | H04W 8/005 370/329 |
| 2015/0365232 A1* | 12/2015 | Yang | H04L 63/062 380/286 |
| 2016/0050552 A1* | 2/2016 | Kim | H04W 8/005 455/434 |
| 2016/0095074 A1* | 3/2016 | Park | H04W 8/005 370/350 |
| 2016/0105503 A1* | 4/2016 | Zhao | H04L 67/1095 705/14.41 |
| 2016/0112438 A1* | 4/2016 | Hengstler | H04L 51/12 726/4 |
| 2016/0381068 A1* | 12/2016 | Galula | H04L 63/123 726/23 |
| 2017/0013005 A1* | 1/2017 | Galula | H04L 63/1425 |

\* cited by examiner

| Destination MAC Address | | Source MAC Address | | Priority Tagging/VLAN ID |
|---|---|---|---|---|
| Ethertype (88B8) | | APPID | | Length |
| Reserved 1 | | Reserved 2 | Length | Tag | goosePDU |
| Length | Tag | gocbRef | Length | Tag | timeAllowedtoLive |
| Length | Tag | datSet | Length | Tag | goID |
| Length | Tag | t | Length | Tag | stNum |
| Length | Tag | sqNum | Length | Tag | test |
| Length | Tag | confRev | Length | Tag | ndsCom |
| Length | Tag | numDatSetEntries | Length | Tag | allData |
| Length | Tag | Data 1 (Boolean) | Length | Tag | Data 2 (Float) |
| •••••• | | •••••• | Length | Tag | Data N |

Figure 1

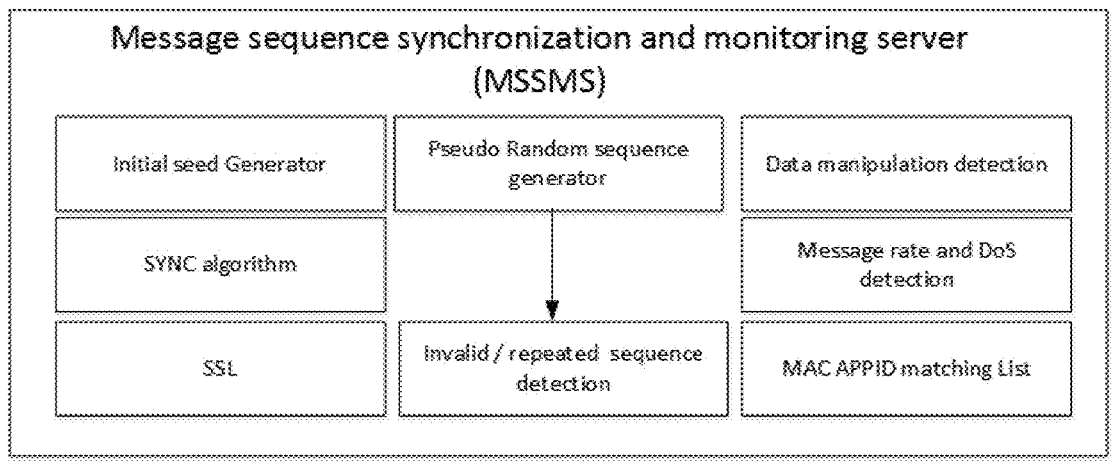

SEQUENCE HOPPING ALGORITHM FOR SECURING GOOSE MESSAGES

BACKGROUND OF INVENTION

Modern power system automation and smart grids rely on communication for various reasons, including critical infrastructure protection and power routing. Communication between substation devices, namely Intelligent Electronic Devices (IED), is integral for substations to keep up with their real-time operations. IEDs are embedded microcontroller systems that support Ethernet-based communication and perform several protective and control functions in a substation automation system (SAS), such as data and file transfer. Unfortunately, whenever data are transferred, there is an opportunity for the data to be intercepted or corrupted. In addition, data can be sent from or intercepted by malicious and unauthorized sources, potentially causing catastrophic consequences.

Industry has established data security protocols in an attempt to avoid the intrusion of malicious and unauthorized sources. However, these protocols often require intensive processing power for which existing, and even some modern IEDs, are not equipped to handle. Adding to the problem, some of the critical data sent between IEDs needs to be transmitted quickly, limiting the amount of encryption/decryption time and further increasing the processing requirements of IEDs. This combination of IEDs lack of processing power and the need for critical information to be relayed quickly has resulted in critical data being transmitted unprotected, leaving an opening for unauthorized and potentially malicious users to cause harm within the system.

BRIEF SUMMARY

Embodiments of the present invention include methods and apparatuses for securing data transfer in power-system automation and smart grids. Embodiments of the present invention can be particularly helpful in securing Generic Object Oriented Substation Event (GOOSE) messages. A method of securing data transfer according to an embodiment of the present invention can include a message sequence synchronization and monitoring server (MSSMS) providing random seeds to a publisher intelligent electronic device (IED) and a subscriber IED, both having a pseudo random number generators (PRNGs), inputting the random seeds into the PRNG of the publisher IED and generating a publisher sequence hopping number, sending a message to the subscriber IED with the publisher sequence hopping number attached, and determining if the message is valid by comparing the publisher sequence hopping number of the message to the subscriber sequence hopping number generated by the subscriber PRNG.

Embodiments of the present invention include apparatuses that can attach to IED devices to implement the methods described in this application. Embodiments of the present invention also include software and firmware that can be loaded onto IEDs to implement the methods described in this application. Furthermore, embodiments of the present invention also include message sequence synchronization and monitoring servers (e.g., a server that can provide random seeds, synchronize IEDs, and monitor attacks).

According to an embodiment of the present invention, an apparatus for securing data transfer in power-system automation can include a processor, volatile and non-volatile memory, an interface for communicating with a publisher and/or subscriber IED, and a machine-readable medium with computer executable instructions stored thereon that when executed by the processor performs a method including receiving a random seed from a message sequence synchronization and monitoring server (MSSMS), inputting the random seed into a pseudo random number generator (PRNG) to produce a publisher sequence hopping number, receiving a message from a publisher IED and attaching the publisher sequence hopping number to the message, and sending the message with the attached publisher sequence hopping number to a subscriber IED, or an MSSMS, or to both a subscriber IED and an MSSMS.

BRIEF DESCRIPTION OF THE DRAWINGS

FIG. 1 shows the structure of a GOOSE Message Datagram.

FIG. 2 shows the structure of a Message Synchronization and Monitoring Server (MSSMS) according to an embodiment of the present invention.

DETAILED DISCLOSURE

Figure 3:
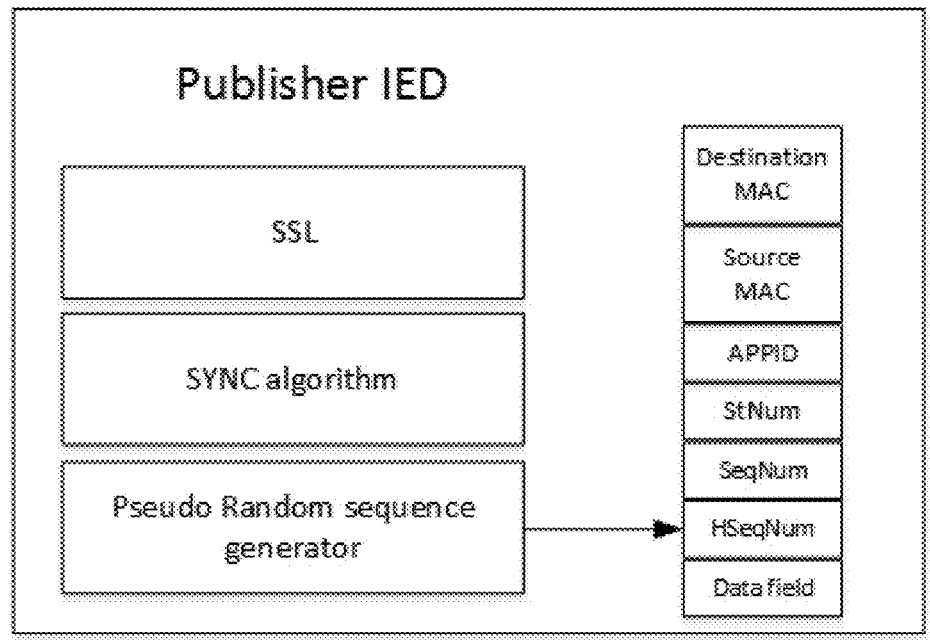
FIG. 3 shows a Publisher Intelligent Electronic Device (IED) according to an embodiment of the present invention.

Communication between substation devices, namely Intelligent Electronic Devices (IED), is integral for substations to keep up with their real-time operations. IEDs are embedded microcontroller systems that support Ethernet-based communication and perform several protective and control functions in a substation automation system (SAS), such as data and file transfer. In order to ensure interoperability between IEDs, IEC 61850 standard was developed by the International Electro-technical Commission (IEC) Technical Committee Number 57 Working Group 10 and IEEE for Ethernet (IEEE 802.3)-based communication in electrical substations. IEC 61850 provides a comprehensive data organization method that unifies data structure definitions across all IED brands. The standard abstracts the definition of the service and data items to be independent from the underlying protocols. The abstracted data items and services can thus be mapped into any other communication protocol. IEC 61850 maps the data to three different protocols based on the application. Manufacturing Message Specification (MMS) protocol is used for control and automation functions whereas Generic Object Oriented Substation Event (GOOSE) and Sampled Measured Values (SMV) protocols are used for real-time operations.

GOOSE messaging is a fast and reliable data exchange protocol between IEDs defined in IEC 61850-8-1, which is the basis of critical power system functions such as power lines protection. GOOSE messages are Ethernet messages sent over layer 2 of the Open System Interconnect OSI model (IEEE 802.3) following a publish/subscribe model. That is, the publishing IED creates a multicast message to which many destination IEDs subscribe concurrently. In order to ensure delivery of the message, at every substation event the publishing IED repeatedly transmits the same GOOSE message with an increasing transmission period until a maximum predefined period is reached.

Traditionally, GOOSE messaging protocol was developed for applications that require a fast and reliable information exchange with strict time constraints within the boundaries of a substation. However, recently, IEC 61850 has been extended to cover applications that require inter-substation communication such as tele-protection, which utilizes GOOSE messages over wide area networks (WAN). A close look at the current engineering literature also shows implementation of IEC 61850 GOOSE messages in some microgrid control applications. Therefore, the criticality of the GOOSE messaging protocol is inherited from its applications. GOOSE messages should be handled with care because any misconfiguration might lead to devastating consequences ranging from system instabilities to complete blackouts.

FIG. 1 shows the structure of a GOOSE Message Datagram. As shown in FIG. 1, the GOOSE datagram starts with the Destination MAC Address, which is a multicast address reserved for IEC 61850 applications always starting with 01-0c-cd and followed by a six octet source MAC address. This is the MAC address of the publishing IED. A GOOSE message has an IEEE 802.1Q VLAN ID and a unique Ethernet type (88-b8). The APPID field is a 4 octet field which the subscribing IEDs use to identify messages they are subscribing to. The Length field represents the length of the overall GOOSE datagram minus eight bytes and is followed by two reserved fields left out by the standard for future use. The goosePDU field itself is composed twelve subfields consisting of the following:

gocbRef: GOOSE control block reference
timeAllowedtoLive: the time a receiver waits before receiving a re-transmitted message.
datSet: name of the Data Set
goID: ID of publishing IED
t: time-stamp indicating a new GOOSE event
stNum: counter that increments with every GOOSE event
sqNum: counter that increments with every repeated GOOSE message
test: specifies if a message is intended for testing or not
confRev: number of times Data Set changed
ndsCom: needs commissioning field
numDataEntries: number of data elements in allData
allData: actual data being sent (bool, integer, float, . . . )

Despite its criticality, IEC 61850 advanced in an era where substations operated in isolated proprietary networks and thus did not include cyber security measures for data communication. However, operators are moving towards open networks and remote access of substation control systems through the aid of contemporary communication technologies such as cloud services. With the realization of this modern communication infrastructure, IEC 62351 emerged in order to tackle the shortcomings of IEC 61850 in terms of communication security. IEC 62351 was developed by IEC TC57 WG15 and consists of eleven parts to cover end-to-end security issues in power systems communications. IEC 62351-6 covers communication security within the boundaries of a substation covering MMS, GOOSE, and SMV protocols. IEC 61850-6 realizes the burden of implementing cryptography on IEDs with relatively low processing power by relaxing its constraints on data confidentiality and advising not to encrypt GOOSE and SMV messages, which require a strict 4 ms response time. The standard suggests the use of digital signature to otherwise ensure the integrity of GOOSE and SMV multicast messages. However, digital signatures can impose even more overhead than encryption on LED's processors and computationally expensive. This fact has resulted in IEC 62351 having little acceptance in the industry.

IEC 62351-6 devises an algorithm for proper processing of GOOSE messages in order to mitigate some cyber-attacks such as replay attacks. From the publishing IED side, each GOOSE message has a status and sequence number fields (stNum and sqNum respectively). When a substation event occurs, such as the sensing of an overcurrent, the publishing IED instantly transmits a message with an incremented stNum field. The message is then repeated with a variably increasing time delay until the maximum defined period is reached. The sqNum counter increments with every repeated message until the maximum number count ($2^{32}-1$) is reached; the point at which the sqNum counter rolls over. IEC 62351-6 states that a subscriber IED that detects a new message with a new stNum must discard any message having a stNum less than that or equal to the previous message and which time allowed to live hasn't timed-out yet, unless a rollover of the stNum counter occurs. If none of the conditions above are true, the subscribing IEDs process the messages.

Issues with the IEC 62351 security measures are inevitable. First, the standard's solution for data integrity using RSA digital signatures will not meet the 4 ms time constraint imposed on GOOSE messages given the low processing power of current IED processors. Studies have also shown that digital signatures fail to meet the 4 ms time constraint even on more advanced processors. Second, the processing of state numbers set by IEC 62351 to counter replay attacks makes the system prone to Denial of Service (DoS) attacks. Since GOOSE messages travel the network unencrypted, an attacker can monitor the network and deduce the current state number. The attacker can then send a message with a very high status number. All the subscribing IEDs will then discard messages from authenticated IEDs because they will have a lesser status number than that published by the attacker.

Realizing the deficiency in securing GOOSE messages within a 4 ms time constraint, embodiments of the present invention propose a minimal resource intensive sequence hopping algorithm for securing GOOSE messages. Embodiments of the present invention include a firmware or software update that can be uploaded to IEDs and a digital board that can be connected to IEDs to assist in secure communications (e.g., a bump-in-the-wire security solution).

Embodiments of the present invention can include the addition of a new field to the GOOSE message called the HseqNum or the "sequence hopping number." Each of the publishing and receiving IEDs can have synchronized pseudo random generators (PRNG) fed with the same seed by a secure mechanism. Therefore, synchronized generation of the same random number will occur inside the publisher and the subscriber IEDs. The subscriber will only accept messages possessing a matching HseqNum as generated by its PRNG. Any message with a repeated or unmatched HseqNum can be discarded.

A Message Sequence Synchronization and Monitoring Server (MSSMS) according to an embodiment of the present invention is shown in FIG. 2. The MSSMS can be responsible for synchronizing all PRNGs in publisher and subscriber IEDs. The MSSMS can use an encrypted connection for synchronization and exchange of initial seeds on all nodes (e.g., through a secure socket layer (SSL) connection). A single seed can be used for an extended period (e.g., over a month), but can also be updated more frequently (e.g., every 1/10 second, second, ten seconds, minute, ten minutes, hour, day, week, or month). In addition, a new seed can be sent out in any attempt for replication or repeating the hopping sequence is detected. Embodiments of the present invention including the sequence hopping algorithm can benefit from the non-blocking Layer 2 broadcast feature in which messages cannot be blocked. Therefore, the only way to manipulate a message is by resending a modified copy of the message. Although the messages are unencrypted, the mathematical complexity of a PRNG is extremely difficult to reverse engineer without a long sequence of numbers. Also, the MSSMS server can generate new seeds before enough numbers are generated for discovering the current seed by correlation. Finally, the MSSMS can monitor all published GOOSE messages for intrusion and tamper detection such as flooding, replay, and data manipulation attacks.

FIG. 3 shows a Publisher Intelligent Electronic Device (IED) according to an embodiment of the present invention. The Publisher IED can include a SSL layer, which can communicate with the MSSMS to exchange seeds, and a PRNG. The PRNG can generate a publisher sequence hopping number (HSeqNum) and the Publisher IED can attach it to a message (to the beginning, end, or middle of the message).

Figure 4:
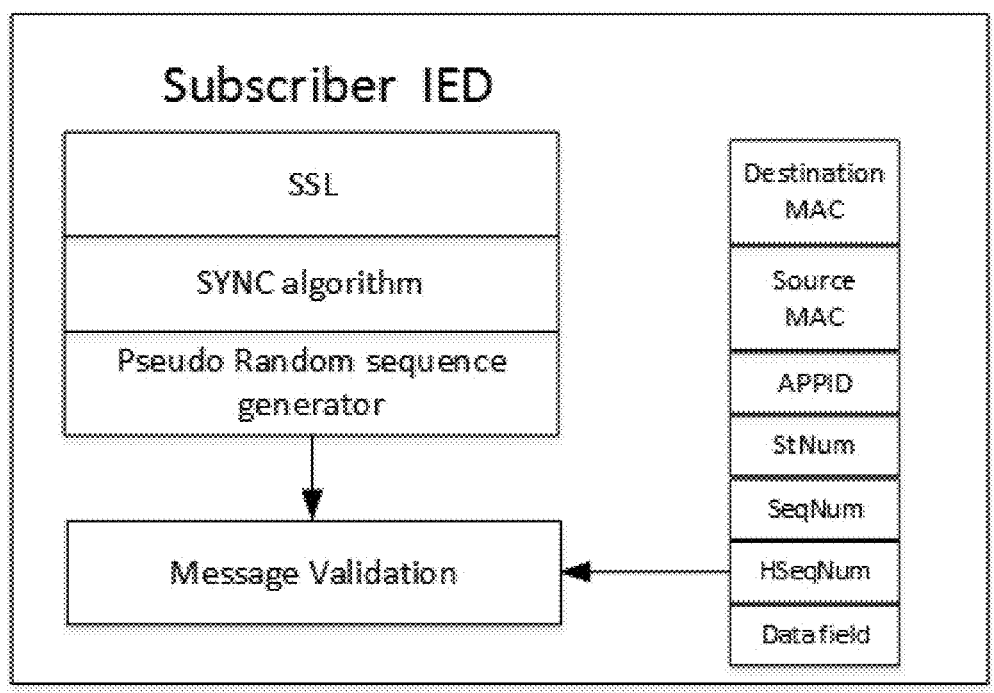
FIG. 4 shows a Subscriber Intelligent Electronic Device (IED) according to an embodiment of the present invention.

FIG. 4 shows a Subscriber Intelligent Electronic Device (IED) according to an embodiment of the present invention. The Subscriber IED can include a SSL layer, which can communicate with the MSSMS to exchange seeds and a PRNG. The PRNG can generate a subscriber sequence hopping number and compare it to the sequence hopping numbers attached to incoming messages.

Figure 5:
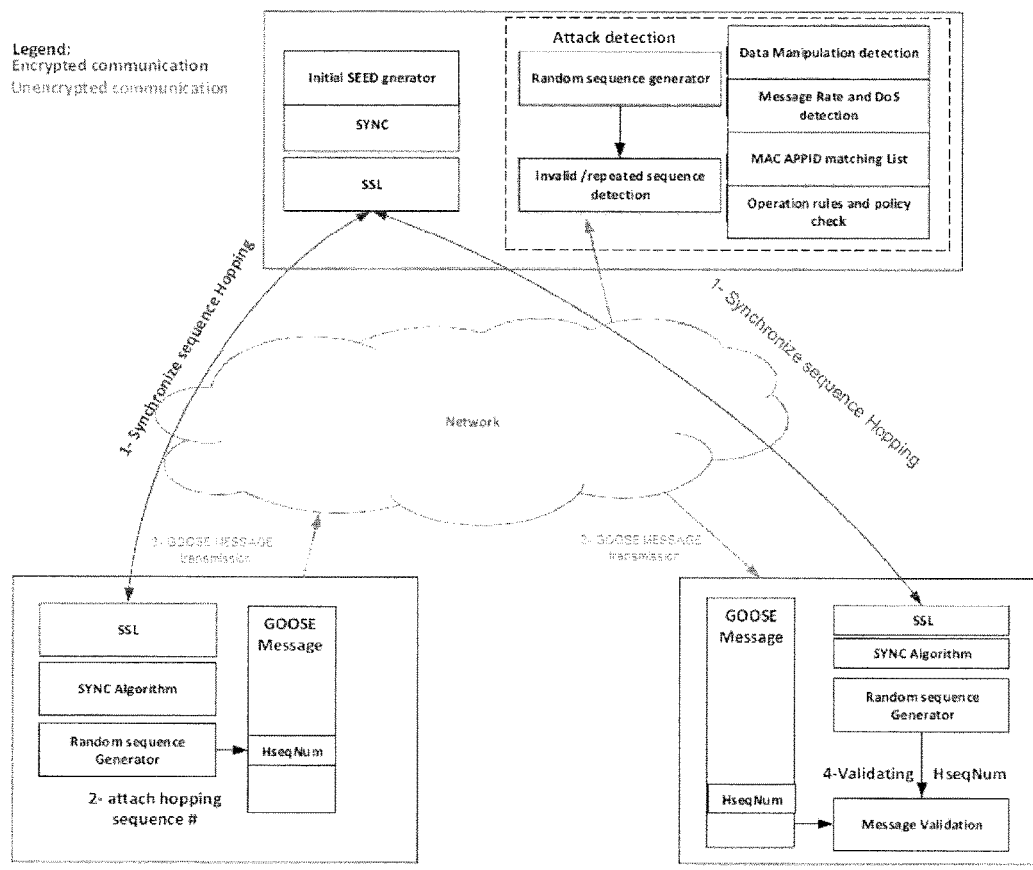
FIG. 5 shows a synchronized sequence hopping framework according to an embodiment of the present invention.

FIG. 5 shows a synchronized sequence hopping framework according to an embodiment of the present invention. An MSSMS is shown in the top box, a publisher IED is shown in the bottom left box, and a subscriber IED is shown in the bottom right box. The MSSMS can include an initial seed generator, a synchronization unit, and a secure socket layer (SSL) interface. The MSSMS can also include an attack detection unit. The attack detection unit can include data manipulation detection, message rate and denial of service detection, a MAC APPID matching list, and an operation rules and policy check unit (which can include checking allocations of bits, pre-defined message data structures, and message information, as well as checking the message content against physical and operation rules such as a connection command to a circuit under maintenance). The publisher and subscriber IEDs can both include an SSL interface, a synchronization algorithm for inputting the seeds from the MSSMS, and a random sequence generator. The Publisher IED can use its PRNG to generate a sequence hopping number (HseqNum) and attach it to a message that is sent through the network to the Subscriber IED. The Subscriber IED can then check the sequence hopping number from a received message and compare it to the sequence hopping number the Subscriber IED generates to determine if the message is valid. If the message is invalid, the Subscriber IED can relay the message to the MSSMS.

Figure 6:
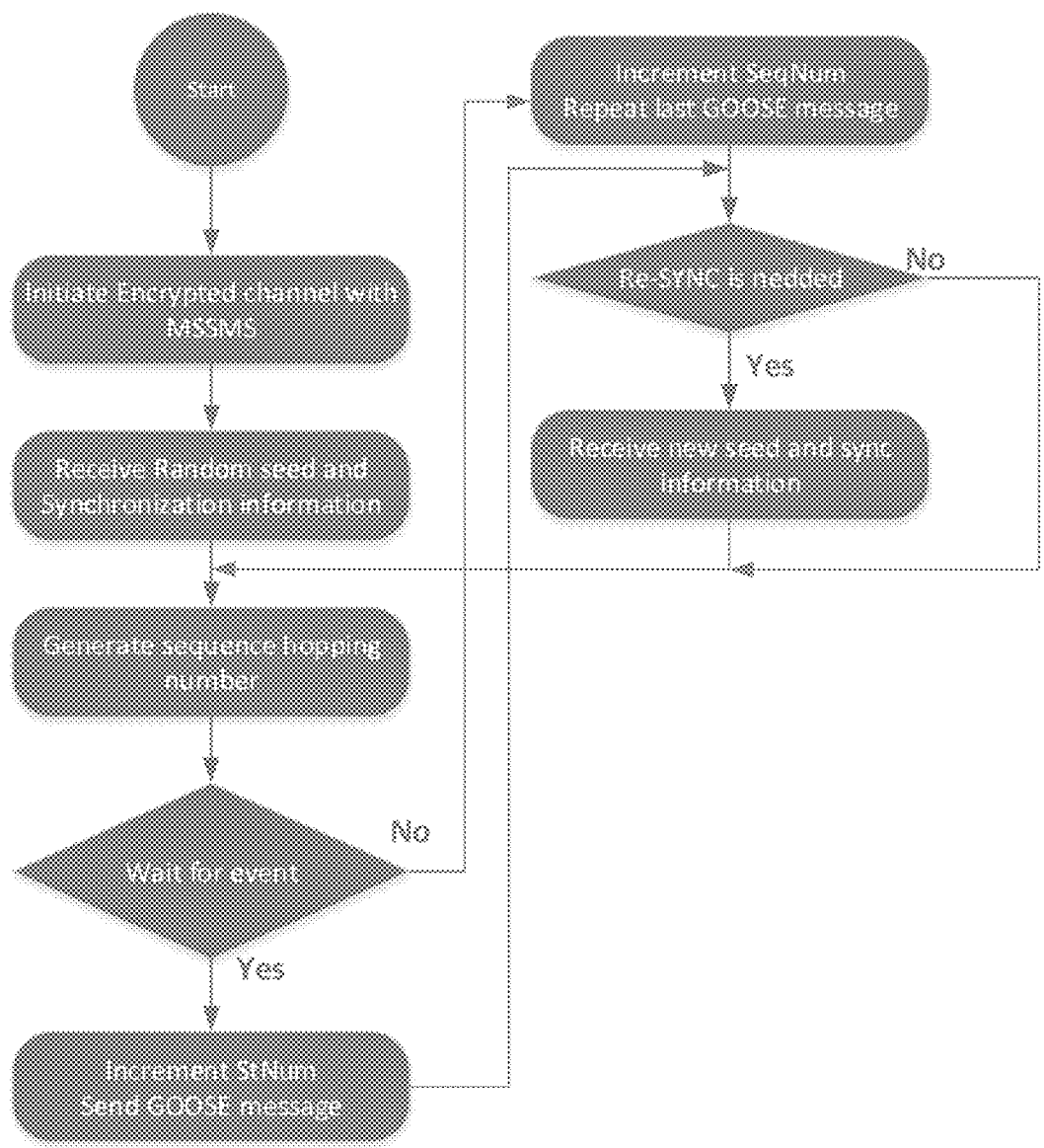
FIG. 6 shows a GOOSE Publisher Flowchart structure according to an embodiment of the present invention.
Figure 7:
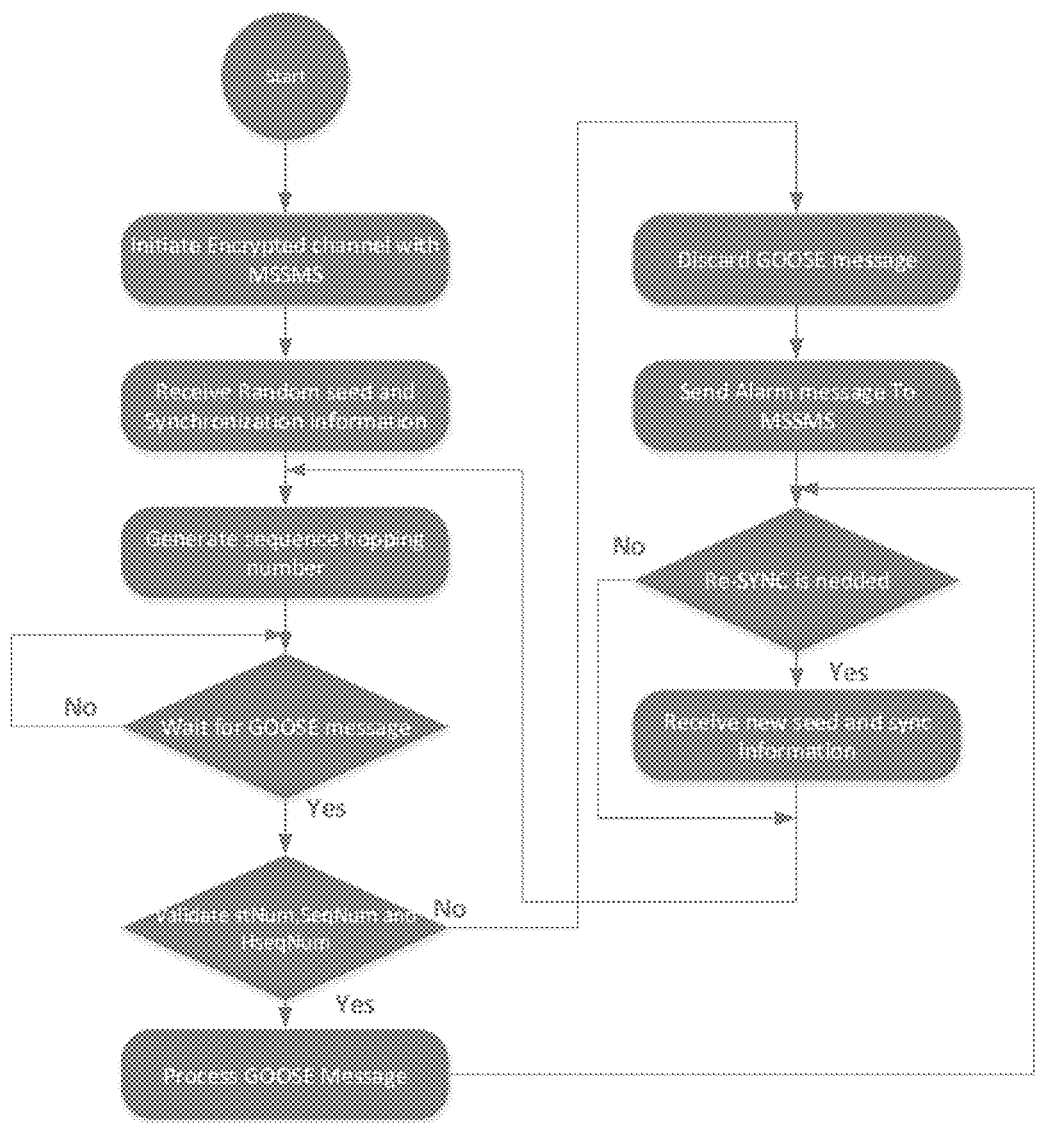
FIG. 7 shows GOOSE Subscriber Flowchart according to an embodiment of the present invention.

FIG. 6 shows a GOOSE Publisher Flowchart structure according to an embodiment of the present invention and FIG. 7 shows GOOSE Subscriber Flowchart according to an embodiment of the present invention. Referring to FIG. 6, the Publisher IED can start by initiating an encrypted channel with an MSSMS and receive a random seed (or a package of random seeds) through the encrypted channel. A sequence hopping number can then be generated using the publisher PRNG and the random seed. If an event happens, the sequence hopping number can be attached to a message and sent through the network to the subscriber IED If there is no event, the last GOOSE message can be repeated. If an error happens, the process can be reinitiated and new seeds can be sent by the MSSMS.

Describing the GOOSE Subscriber Flowchart of FIG. 7, the process can start with the subscriber IED initiating an encrypted channel with an MSSMS. The subscriber IED can receive random seed and synchronization information from the MSSMS and generated a sequence hopping number by inputting a seed into the subscriber PRNG. If a message is received, it can be validated by determining if the sequence hopping number attached to the message corresponds to the sequence hopping number generated by the subscriber IED If no message is received, the sequence hopping number of the subscriber IED can be regenerated from new seeds. If a received message is invalid (e.g., the sequence hopping numbers of the message and subscriber IED don't correspond), the message can be discarded and an alarm can be sent to the MSSMS. If the subscriber IED goes out of sync with the MSSMS, the system can be resynchronized and new seeds can be sent to the subscriber IED.

A method according to an embodiment of the present invention can proceed as follows. The MSSMS server can generate a sequence of random seeds. Upon joining the network, a publisher IED can initiate an encrypted communication channel with the MSSMS server. This encrypted channel can be used to exchange random seeds with the publishers. The publisher IED can then use the random seeds to generate a sequence hopping number and attach it to each transmitted message. The MSSMS can also synchronize all the subscriber IED devices with the same random seeds. The subscriber IED will expect a unique sequence hopping number for each received message. Any message with an invalid or repeated sequence hopping number can be discarded. The MSSMS server can synchronize the devices periodically with new patterns for further protection from attacks.

After the synchronization process, an MSSMS server can monitor the messages published by IEDs for possible attacks (e.g., by receiving messages relayed from subscriber IEDs and/or receiving messages directly from publisher IEDs). The MSSMS can monitor the messages' publishing rate, check their sequence hopping field for repeated or invalid patterns, and check the message content against pre-defined operation rules and message structures (e.g., the type of fields present, the number of bytes in each field, invalid content, etc.). The message can be validated by pre-defined policies related to the substation operation scenarios. For example, if a power circuit is disconnected for maintenance, the MSSMS server can determine that any message intended to energize the circuit as invalid message and can send an alarm signal. The alarm signal can be incorporated into error reports, it can alert equipment operators of potential attacks, and it can also implement additional measures to ensure that IEDs operating on the network are in their correct operation modes (e.g., by overriding invalid messages)

GOOSE messages can be categorized based on the APPID or Application ID field. That is, a GOOSE message for controlling circuit breaker 1 (CB1) can have a unique APPID relative to GOOSE messages intended for different applications. Therefore, an MSSMS can keep track of the association of APPIDs with the source MAC address of the message in order to prevent sending fake GOOSE messages from unauthenticated devices. Each GOOSE message can have fields for source addresses and APPIDs. The APPID can be used to define the message application. The source MAC address defines the sender of the message. Embodiment of the present invention can include an MSSMS server with a list with APPIDs and allowed devices to send messages with the APPIDs to monitor attempts to send message by unauthorized devices.

The methods and processes described herein can be embodied as code and/or data. The software code and data described herein can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments.

Embodiment 1

A method of securing data transfer in power-system automation comprising:
providing a message sequence synchronization and monitoring server (MSSMS);
providing a publisher intelligent electronic device (IED) having a pseudo random number generator (PRNG);
providing a subscriber IED having a PRNG;
generating a random seed from the MSSMS and transferring the random seed to the publisher IED and the subscriber IED using an encrypted channel;
inputting the random seed into the PRNG of the publisher IED and generating a publisher sequence hopping number;
inputting the random seed into the PRNG of the subscriber IED to generate a subscriber sequence hopping number;
sending a message from the publisher IED to the subscriber IED and attaching the publisher sequence hopping number to the message;
comparing the subscriber sequence hopping number to the publisher sequence hopping number of messages received by the subscriber IED; and
accepting messages (i.e., valid messages) in which the subscriber sequence hopping number corresponds to (or matches) the publisher sequence hopping number of messages received by the subscriber IED, and discarding messages (i.e., invalid messages) in which the subscriber sequence hopping number does not correspond to the publisher sequence hopping number.

Embodiment 2

The method of embodiment 1, wherein if the subscriber IED receives a message having a repeated publisher sequence hopping number, the message is discarded.

Embodiment 3

The method of any of embodiments 1 to 2, wherein the MSSMS sends a new seed (or sequence of seeds) to the publisher IED and subscriber IED periodically (e.g., every millisecond, hundredth of a second, tenth of a second, second, 10 seconds, 30 seconds, minute, 10 minutes, 30 minutes, hour, or day).

Embodiment 4

The method of any of embodiments 1 to 3, wherein the MSSMS monitors the messages published by IEDs to detect attacks (including intrusion and tamper detection, flooding, replay and data manipulation).

Embodiment 5

The method of any of embodiments 1 to 4, wherein the MSSMS detects attacks by monitoring the publisher IED messages' publishing rate, monitoring the IED messages for repeated and invalid publisher sequence hopping numbers, and evaluating the IED messages content and form against pre-defined operation rules (including allocations of bits, pre-defined message data structures, and message information (such as invalid requests to power on a substation during maintenance)).

Embodiment 6

The method of any of embodiments 1 to 5, wherein the subscriber IED relays messages (including invalid messages, or valid messages, or both) to the MSSMS.

Embodiment 7

The method of any of embodiments 1 to 6, wherein the subscriber IED sends only invalid (or discarded) messages to the MSSMS.

Embodiment 8

The method of any of embodiments 1 to 7, wherein the publisher IED repeatedly (more than once) sends the same message.

Embodiment 9

The method of any of embodiments 1 to 8, wherein the publisher IED repeatedly sends the same message using a new seed and a new publisher sequence hopping number.

Embodiment 10

The method of any of embodiments 1 to 9, wherein MSSMS sends the same random seed to multiple subscriber IEDs.

Embodiment 11

The method of any of embodiments 1 to 10, wherein MSSMS sends different random seeds to multiple subscriber IEDs.

Embodiment 12

The method of any of embodiments 1 to 11, wherein MSSMS sends the same random seed to multiple publisher IEDs.

Embodiment 13

The method of any of embodiments 1 to 12, wherein MSSMS sends different random seeds to multiple publisher IEDs.

Embodiment 14

The method of any of embodiments 1 to 13, wherein the MSSMS sends a first random seed to a first set of publisher and subscriber IEDs and a second random seed to a second set of publisher and subscriber IEDs.

Embodiment 15

The method of any of embodiments 1 to 14, wherein the MSSMS sends a third random seed to a third set of publisher and subscriber IEDs.

Embodiment 16

The method of any of embodiments 1 to 15, wherein the MSSMS sends an alarm signal (or a notification) when it detects an attack or an invalid message.

Embodiment 17

The method of any of embodiments 1 to 16, wherein the subscriber IED sends an alarm signal when it detects an attack or an invalid message.

Embodiment 18

The method of any of embodiments 1 to 17, wherein the message is a GOOSE message.

Embodiment 19

The method of any of embodiments 1 to 18, wherein the MSSMS sends a new random seed when an invalid message is received by a subscriber IED

Embodiment 20

The method of any of embodiments 1 to 19, wherein the encrypted channel is a secured socket layer (SSL) connection or another encryption mechanism.

Embodiment 21

The method of any of embodiments 1 to 20, wherein the MSSMS sends multiple seeds at once (or a sequence of seeds) to the publisher IED, the subscriber IED, or both.

Embodiment 22

The method of any of embodiments 1 to 21, wherein the MSSMS sends multiples seeds at once to the publisher IED, the subscriber IED, or both (the can be used either consecutively or in a predetermined pattern (e.g., depending on how much time has passed, in reverse order, etc.).

Embodiment 23

The method of any of embodiments 1 to 22, wherein the MSSMS validates the messages against predefined policies (e.g., if a power circuit is disconnected for maintenance, the MSSMS server will consider it an invalid message and send an alarm signal).

Embodiment 24

The method of any of embodiments 1 to 23, wherein the MSSMS tracks the association of APPIDs with source MAC addresses of messages (to prevent sending fake GOOSE messages from unauthorized devices).

Embodiment 25

The method of any of embodiments 1 to 24, wherein the MSSMS sends a package of multiple random seeds (at one time) to the publisher IED, subscriber IED, or both.

Embodiment 26

The method of any of embodiments 1 to 25, wherein the MSSMS is embedded in the publisher IED, or the subscriber IED, or a remote server, or a bump-in-the-wire apparatus attached to the publisher or subscriber IED

Embodiment 27

The method of any of embodiments 1 to 26, wherein the publisher IED sends a two or more messages (which can be consecutive) using the same publisher sequence hopping number.

Embodiment 101

An apparatus for securing data transfer in power-system automation comprising a processor, volatile and non-volatile memory, an interface for communicating with a publisher and/or subscriber IED, and a machine-readable medium with computer executable instructions stored thereon that when executed by the processor performs a method comprising:
  receiving a random seed from a message sequence synchronization and monitoring server (MSSMS) and inputting the random seed into a pseudo random number generator (PRNG) to produce a publisher sequence hopping number;
  receiving a message from a publisher IED and attaching the publisher sequence hopping number to the message; and sending the message with the attached publisher sequence hopping number to a subscriber IED, or an MSSMS, or to both a subscriber IED and an MSSMS.

Embodiment 102

The apparatus of embodiment 101, wherein the method the apparatus performs further comprises:
receiving a random seed from a message sequence synchronization and monitoring server (MSSMS) and inputting the random seed into a pseudo random number generator (PRNG) to produce a subscriber sequence hopping number;
receiving a message having a publisher sequence hopping number;
comparing the subscriber sequence hopping number to the publisher sequence hopping number of the message;
accepting messages in which the subscriber sequence hopping number corresponds to the publisher sequence hopping number of messages received, and discarding messages in which the subscriber sequence hopping number does not correspond to the publisher sequence hopping number of messages received by the subscriber IED.

Embodiment 103

The apparatus of embodiment 101 to 102, wherein the method the apparatus performs further comprises one or more of the steps of the method articulated in embodiments 1 to 27.

Embodiment 104

The apparatus of embodiment 101 to 103, wherein the apparatus is a bump-in-the-wire security solution (i.e., it can attach to existing publisher and subscriber IEDs as an add-on).

Embodiment 201

An apparatus for securing data transfer in power-system automation comprising a processor, volatile and non-volatile memory, an interface for communicating with a publisher and/or subscriber IED, and a machine-readable medium with computer executable instructions stored thereon that when executed by the processor performs a method comprising one or more of the steps of the method of embodiments 1 to 27.

Embodiment 202

The apparatus of embodiment 201, wherein the apparatus is a bump-in-the-wire security solution.

Embodiment 301

A non-transitory computer readable medium with computer executable instructions stored thereon that when executed by a processor perform a method comprising one more steps of the method of embodiments 1 to 27 (including the steps of the publisher IED, or the subscriber IED, or both the publisher and subscriber IED, or the MSSMS, or the subscriber IED and MSSMS, or the publisher IED and MSSMS, or the publisher and subscriber IED and the MSSMS).

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section, if present) are incorporated by reference in their entirety, including all figures and tables, to the extent they are not inconsistent with the explicit teachings of this specification.

What is claimed is:

1. A method of securing data transfer in power-system automation, the method comprising:
providing a message sequence synchronization and monitoring server (MSSMS) that is communicating with an automated power server;
providing a publisher intelligent electronic device (IED) having a first pseudo random number generator (PRNG);
providing a subscriber IED having a second PRNG, the second PRNG being synchronized with the first PRNG such that, for a given random seed input into the second PRNG, the second PRNG will generate a sequence hopping number that corresponds to that which the first PRNG would generate when the same given random seed is input into the first PRNG;
generating a random seed from the MSSMS and transferring the random seed to the publisher IED and the subscriber IED using an encrypted channel;
inputting the random seed into the first PRNG of the publisher IED and generating a publisher sequence hopping number;
inputting the random seed into the second PRNG of the subscriber IED and generating a subscriber sequence hopping number;
sending a Generic Object Oriented Substation Event (GOOSE) message from the publisher IED to the subscriber IED and attaching the publisher sequence hopping number to the GOOSE message;
comparing the subscriber sequence hopping number to the publisher sequence hopping number of a GOOSE message received by the subscriber IED;
accepting the GOOSE message if the subscriber sequence hopping number corresponds to the publisher sequence hopping number of the GOOSE message received by the subscriber IED; and
discarding the GOOSE message if the subscriber sequence hopping number does not correspond to the publisher sequence hopping number of the GOOSE message received by the subscriber IED, resulting in securing of data transfer of the automated power system.

2. A method of securing data transfer in power-system automation, the method comprising:
providing a message sequence synchronization and monitoring server (MSSMS) that is communicating with an automated power system;
providing a publisher intelligent electronic device (IED) having a first pseudo random number generator (PRNG);
providing a subscriber IED having a second PRNG, the second PRNG being synchronized with the first PRNG such that, for a given random seed input into the second PRNG, the second PRNG will generate a sequence hopping number that corresponds to that which the first PRNG would generate when the same given random seed is input into the first PRNG;

generating a random seed from the MSSMS and transferring the random seed to the publisher IED and the subscriber IED;

inputting the random seed into the first PRNG of the publisher IED and generating a publisher sequence hopping number;

inputting the random seed into the second PRNG of the subscriber IED and generating a subscriber sequence hopping number;

sending a message from the publisher IED to the subscriber IED and attaching the publisher sequence hopping number to the message;

comparing the subscriber sequence hopping number to the publisher sequence hopping number of a message received by the subscriber IED; and accepting the received message if the subscriber sequence hopping number corresponds to the publisher sequence hopping number of the message received by the subscriber IED, resulting in securing of data transfer of the automated power system.

3. The method of claim 2, wherein the random seed is transmitted using an encrypted channel.

4. The method of claim 2, wherein if the subscriber IED receives a message having a repeated publisher sequence hopping number, the message is discarded.

5. The method of claim 2, further comprising sending a new random seed to the publisher IED and the subscriber IED periodically.

6. The method of claim 2, further comprising monitoring the messages published by IEDs for attacks by monitoring the publisher IED messages' publishing rate; monitoring the IED messages for repeated and invalid publisher sequence hopping numbers; and evaluating the IED messages content and form against pre-defined operation rules including allocations of bits, pre-defined message data structures, and message information.

7. The method of claim 6, wherein the subscriber IED relays messages to a message sequence synchronization and monitoring server (MSSMS).

8. The method of claim 2, wherein the seed is sent to multiple subscriber IEDs.

9. The method of claim 2, further comprising sending a first random seed to a first set of publisher and subscriber IEDs and a second random seed to a second set of publisher and subscriber IEDs.

10. The method of claim 3, wherein the message is a GOOSE message.

11. The method of claim 3, further comprising sending a new random seed when an invalid message is received by a subscriber IED.

12. The method of claim 3, wherein a package of multiple seeds are sent to the publisher IED, the subscriber IED, or both.

13. The method of claim 3, further comprising tracking an association of APPIDs with source MAC addresses to prevent attacks.

14. The method of claim 6, wherein the subscriber IED sends an alarm signal when it detects an attack or an invalid message.

15. The method of claim 2, wherein the message is a sample measured value (SMV) message.

16. A system for securing data transfer in power-system automation, the system comprising:

an automated power system;

a publisher intelligent electronic device (IED) having a first pseudo random number generator (PRNG);

a subscriber IED having a second PRNG, the second PRNG being synchronized with the first PRNG such that, for a given random seed input into the second PRNG, the second PRNG will generate a sequence hopping number that corresponds to that which the first PRNG would generate when the same given random seed is input into the first PRNG; and a message sequence synchronization and monitoring server (MSSMS) communicating with the publisher IED, the subscriber IED, and the automated power system, the MSSMS comprising:

a processor;

volatile and non-volatile memory;

an interface for communicating with the publisher IED and/or the subscriber IED; and a machine-readable medium with computer executable instructions stored thereon that when executed by the processor performs a method comprising:

sending a random seed to the publisher IED such that the random seed is input into the first PRNG to produce a publisher sequence hopping number;

sending the random seed to the subscriber IED such that the random seed is input into the second PRNG to produce a subscriber sequence hopping number; and if an alarm is received from the subscriber IED indicating that a message was received by the subscriber IED that did not have a publisher sequence hopping number corresponding to the subscriber sequence hopping number, generating an updated random seed and sending the updated random seed to the publisher IED and the subscriber IED to produce an updated publisher sequence hopping number and an updated sequence hopping number, respectively, the publisher IED being configured to send a message to the subscriber IED and attaching the publisher sequence hopping number to the message, the subscriber IED being configured to receive the message from the publisher IED, compare the publisher sequence hopping number to the subscriber sequence hopping number, accept the message if the subscriber sequence hopping number corresponds to the publisher sequence hopping number, and discard the message if the subscriber sequence hopping number does not correspond to the publisher sequence hopping number, resulting in securing of data transfer of the automated power system.

17. The system of claim 16, wherein the system is a bump-in-the wire system.

18. The system of claim 16, wherein the message the publisher IED is configured to send to the subscriber IED is a Generic Object Oriented Substation Event (GOOSE) message.

* * * * *

UNITED STATES PATENT AND TRADEMARK OFFICE
CERTIFICATE OF CORRECTION

| | |
|---|---|
| PATENT NO. | : 9,894,080 B1 |
| APPLICATION NO. | : 15/285126 |
| DATED | : February 13, 2018 |
| INVENTOR(S) | : Tarek Youssef, Mohamad El Hariri and Osama Mohammed |

Page 1 of 1

It is certified that error appears in the above-identified patent and that said Letters Patent is hereby corrected as shown below:

In the Specification

Column 1, Line 5 please insert:
--GOVERNMENT SUPPORT
This invention was made with government support under Grant Number DE-OE0000779 awarded by the Department of Energy (DOE). The government has certain rights in the invention.--

Signed and Sealed this
Sixteenth Day of June, 2020

Andrei Iancu
*Director of the United States Patent and Trademark Office*